United States Patent [19]

Miyakawa et al.

[11] 4,205,884
[45] Jun. 3, 1980

[54] ANTI-SKID BRAKING SYSTEM FOR A VEHICLE

[75] Inventors: Yoshitaka Miyakawa, Kawagoe; Motohiro Okada, Asaka; Makoto Sato, Kamifukuoka, all of Japan

[73] Assignee: Hondo Giken Kogyo Kabushiki Kaisha, Tokyo, Japan

[21] Appl. No.: 955,025

[22] Filed: Oct. 25, 1978

[30] Foreign Application Priority Data

Nov. 15, 1977 [JP] Japan .................................. 52-137132
Nov. 15, 1977 [JP] Japan .................................. 52-137135

[51] Int. Cl.² .............................................. B60T 8/00
[52] U.S. Cl. .................................... 303/92; 303/116
[58] Field of Search ...................... 303/92, 115, 116

[56] References Cited

U.S. PATENT DOCUMENTS

| 3,716,275 | 2/1973 | Skoyles | 303/92 |
| 3,833,269 | 9/1974 | Trui | 303/92 |
| 3,874,744 | 4/1975 | Huber | 303/92 |

Primary Examiner—Trygve M. Blix
Assistant Examiner—Reinhard J. Eisenzopf

[57] ABSTRACT

An anti-skid braking system for a vehicle comprising a brake unit actuated by pressure generated in a master cylinder by driver actuation and a hydraulic control circuit for hydraulically controlling the actuation of the brake unit to reduce the braking action of the brake unit when an excessive braking force is applied by the brake unit to the brakes of the vehicle wheels. The hydraulic control circuit includes an output section to which a safety valve is connected for releasing the oil pressure when the pressure in the hydraulic control circuit is supplied for a period exceeding a predetermined time.

3 Claims, 8 Drawing Figures

ANTI-SKID BRAKING SYSTEM FOR A VEHICLE

FIELD OF THE INVENTION

The present invention relates to an anti-skid braking system for a vehicle wherein a control hydraulic circuit for reducing the braking action of a brake means when the braking force thereof is undue or excessively large, is provided with a safety valve in order that the brake means may properly perform its braking function at all times even if the control hydraulic circuit fails while reducing the braking action of the brake means.

PRIOR ART

When a braking force is excessively applied in an attempt to brake rotation of the wheels by actuating a brake device during the running of a vehicle the wheels are locked to produce a so-called skidding, and as a consequence, not only is the braking effect diminished, but the directional stability of the vehicle as well as the steerability thereof are greatly affected and pose great danger.

There has heretofore been proposed an anti-skid braking system for a vehicle provided with a control device for controlling the actuation of the brake device so as to reduce the braking action of the brake device when an excessively large braking force is applied by the brake device. However, in this case, when the control device fails while reducing the braking action of the brake device any subsequent braking by the brake device becomes impossible.

If a control hydraulic circuit for controlling the actuation of the brake device by oil pressure is used in the control device for controlling the actuation of the brake device, it is possible to obtain an anti-skid braking system which is easy to control, simple in construction and relatively trouble-free. It is usually necessary to incorporate electromagnetic changeover valves, various electric devices for controlling the opening and closing of these electromagnetic changeover valves and various types of hydraulic equipment into the control hydraulic circuit. It is extremely difficult to completely remove failure of these devices from a technical viewpoint.

The optimum braking force is largely affected by the state of the surface on which the vehicle runs. However, in the case of development of the excessively large braking force during the normal operation of the anit-skid brake system, the braking action by means of the brake device and the brake controlling action by means of the control device alternately occur as the vehicle decelerates so that the control device will not continuously reduce the braking action of the brake device. A level of the brake controlling force by means of the control device at the time is greatly affected by the state of the road surface. However, when the anti-skid braking system fails while restricting the braking action of the brake device, the brake controlling action by means of the control device is continued irrespective of the state of the road surface. Therefore, the duration of the brake force reducing action over a period in excess of a given time enables sensing a failure of the anti-skid braking system, but it is impossible to effect braking by the brake device in such state and this is very dangerous for the movable vehicle.

SUMMARY OF THE INVENTION

It is a primary object of the present invention to provide an anti-skid braking system for a vehicle wherein the control device for controlling the braking action of a brake device is provided with a safety device which avoids the disadvantages noted in the prior art.

It is another object of the present invention to provide an anti-skid braking system, which is provided with a control hydraulic circuit for controlling the actuation of a brake device by oil pressure as a control means for controlling the braking action of the brake device, and a safety device which can insure proper braking action of the brake device with a positive safety function even in the event of failure of any device or equipment related to the control hydraulic circuit.

The present invention contemplates an anti-skid braking system for a vehicle, which is provided with a safety valve adapted to release control oil pressure in a control hydraulic circuit to the outside of a control system while the control hydraulic circuit keeps supplying control oil pressure as an output.

DETAILED DESCRIPTION

Figure 1:
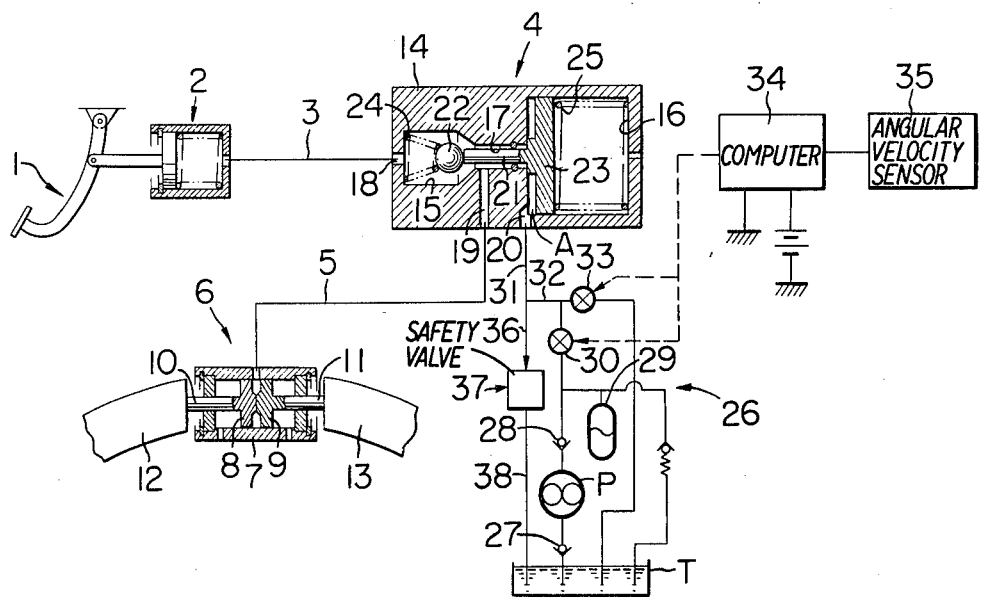
FIG. 1 is a schematic illustration of a principal part showing one embodiment of an anti-skid braking system for a vehicle in accordance with the present invention.

Hereafter several embodiments of the present invention will be described with reference to the accompanying drawings. Referring first to FIG. 1, an output portion of a master cylinder 2 actuated by a brake pedal 1 is in communication with a wheel cylinder 7, which constitutes a brake device 6, through an oil passage 3, a braking oil pressure control device 4 and an oil passage 5. A pair of pistons 8 and 9 placed in sliding contact in opposed relation with each other within the wheel cylinder 7 have brake shoes 12 and 13 connected thereto through rods 10 and 11, respectively, so that when pressure oil is introduced into an oil chamber formed between opposed surfaces of the pistons 8 and 9 the pistons are urged outwardly and move each of brake shoes 12 and 13 to cause the brake shoes to be brought into frictional engagement with brake linings of wheels (not shown) to brake rotation of the wheels.

A casing 14 for the braking oil pressure control device 4 is formed with an internal valve chamber 15 in communication with the oil passage 3 through an opening 18, a cylinder chamber 16, and a bore 17 which extends between the valve chamber 15 and the cylinder chamber 16 and communicates with the oil passage 5 through an opening 19. The cylinder chamber 16 slidably receives therein a piston 23 which can operate conjointly with a valve ball 22 within the valve chamber 15 through a connecting rod 21 extending through the bore 17.

The connecting rod 21 has an outside diameter suitably smaller than the inside diameter of the bore 17, and the connecting rod 21 is slidably supported on the internal wall surface of the bore 17 through a seal member positioned between the opening 19 and the cylinder chamber 16. The valve ball 22 is normally resiliently biased towards the cylinder chamber 16 by a bias spring 24 within the valve chamber 15, and the piston 23 is normally resiliently biased towards the valve chamber 15 by a bias spring 25 within the cylinder chamber 16. The biasing force of the bias spring 25 is sufficiently greater than that of the bias spring 24, and normally, the piston 23 is in a position close to the left end wall of the cylinder chamber 16 and the valve ball 22 is spaced from the opening end of the bore 17 so that the valve chamber 15 is in communication with the oil passage 5 through the opening 19.

The construction is such that even in the state where the piston 23 is positioned closest to the left end wall of chamber 16 an oil chamber A is formed between the piston 23 and the left end wall of the cylinder 16. The oil chamber A has an opening 20 so that the oil chamber can come into communication with an output portion of a control hydraulic circuit 26 at all times irrespective of the position of the piston 23.

In the control hydraulic circuit 26, working oil drawn and pressurized from an oil tank T by a pump P is fed into a pressure accumulator 29 through an oil passage 31 provided with check valves 27 and 28. A valve 30 is disposed in the oil passage 31 between the pressure accumulator 29 and the opening 20, and an oil passage 32 is branched from the oil passage 31 between the valve 30 and the opening 20, the oil passage 32 being provided with a valve 23 and being in communication with the oil tank T. Each of the valves 30 and 33 is electromagnetically actuated by output signals from a computer 34. The computer 34 receives an output signal from an angular velocity sensor 35 to judge the presence of danger in locking the wheels and controls the opening and closing of valves 30 and 33 so that when the braking force is excessive, that is, there is a danger of locking the wheels, the valve 30 is opened whereas the valve 33 is changed over to its closed position, and when the braking force is adequate, the valve 30 is maintained closed whereas the valve 33 maintained opened. The sensor 35 and computer 34 are conventional elements and require no elaboration whatsoever herein to understand the construction and operation of the invention. It is sufficient to note that the sensor 35 provides wheel speed values and the computer receives these values and determines if these values fall within acceptable limits.

Thus, when the braking force of the brake device 6 is within suitable limits, the oil chamber A is cut off from the pressure accumulator 29 by the valve 30 and is brought into communication with the oil tank T by the valve 33 and the piston 23 is biased by the bias spring 25 towards the valve chamber 15, and hence, braking oil pressure generated by the master cylinder 2 is transmitted to the wheel cylinder 7 through the valve chamber 15. On the other hand, when the braking force of the brake device 6 is excessive the oil chamber A is cut off from the oil tank T due to the closure of the valve 33 and the valve 30 is opened, and hence, pressure oil having passed through the pressure accumulator 29 flows into the oil camber A via the valve 30 and the opening 20 to urge and move the piston 23 on a direction away from the valve chamber 15. As a result, the valve ball 22 blocks the opening of the bore 17 to prevent further flow of braking oil from the master cylinder 2 into the wheel cylinder 7. In addition, since pressure oil further flows into the oil chamber A from the pressure accumulator 29, the piston 23 and the connecting rod 21 integral therewith are moved further back so that the volume of the portion in communication with the wheel cylinder 7 increases by the amount by which the connecting rod 21 is moved back within the bore 17. This decreases the braking oil pressure and decreases the braking force accordingly thereby to prevent the wheels from being locked. As a consequence, if the wheels are no longer in danger of locking, the computer 34 singals such state and returns the valves 30 and 33 to their initial states, thus again increasing the braking force.

If a failure occurs in the control hydraulic circuit 26, the sensor 35 or the computer 34 while valve 30 was open and valve 33 was closed, thus disabling the changeover of each of the valves 30 and 33, the piston 23 is urged and moved towards the right side of the valve chamber 15 against the biasing force of the bias spring 25, and as a result, the brake device 6 fails to properly perform its function. In order to avoid such a dangerous condition, there is provided an oil passage 36, which extends to a safety valve 37 in communication with the oil tank T through an oil passage 38, branched from the oil passage 31 between the valve 30 and the opening 20. The detailed construction of the safety valve 37 will be described later.

Figure 2:
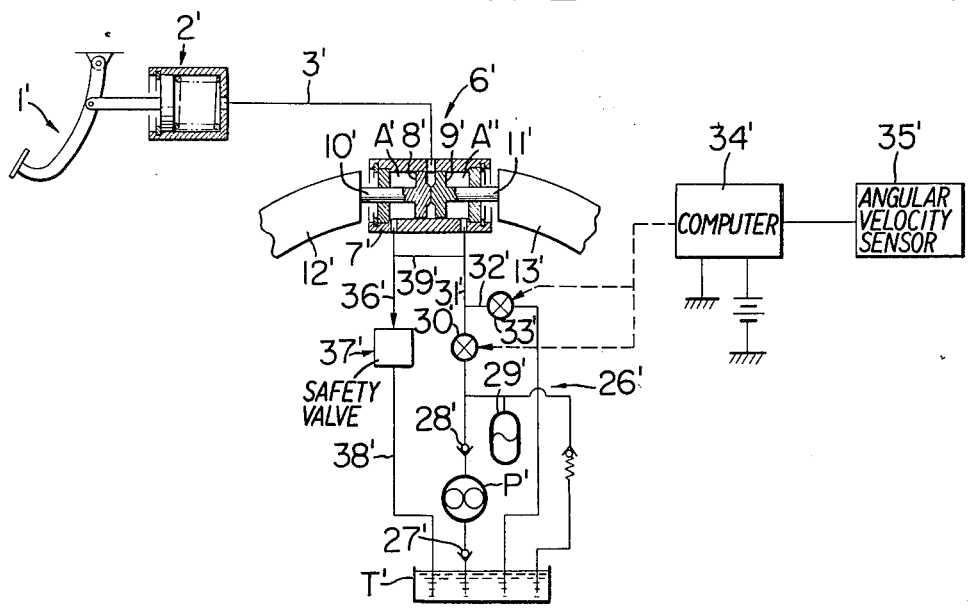
FIG. 2 is a schematic illustration of a principal part similar to FIG. 1 showing another embodiment of the present invention.

An anti-skid braking system of a type different from FIG. 1 is illustrated in FIG. 2. Therein, a master cylinder 2' actuated by a brake pedal 1' is in communication with a wheel cylinder 7' of a brake device 6' through an oil passage 3'. A pair of opposedly disposed pistons 8' and 9' are slidably fitted in the wheel cylinder 7', the pistons 8' and 9' having brake shoes 12' and 13' connected thereto through rods 10' and 11' respectively. The principle of braking the wheels by means of these brake shoes 12' and 13' is similar to the principle of braking the wheels by means of the brake shoes 12 and 13 shown in FIG. 1.

The cylinder 7' forms oil chambers A' and A" respectively at the back pressure sides of pistons 8' and 9' which are in communication with control hydraulic circuits 26' and oil passage 31', respectively, through conduit 39'. In the control hydraulic circuit 26', working oil drawn and pressurized from an oil tank T' by a pump P' is fed into a pressure accumulator 29' through an oil passage 31' provided with check valves 27' and 28'. A valve 30' is disposed in the oil passage 31' between the pressure accumulator 29' and the oil passage 39. An oil passage 32' is branched from the oil passage 31' between the valve 30' and the oil passage 39' which is provided with a valve 33' controlling communication with the oil tank T'. A computer 34' receives the output signals from a wheel angular velocity sensor 35' to control each of the valves 30' and 33' so that when the braking force is excessive, the valve 30' is opened and the valve 33' is changed over to its closed position, whereas when the braking force is within acceptable limits, the valve 30' is maintained closed while the valve 33' is maintained opened.

Thus, while the braking force of the brake device 6' is acting on the wheels within suitable limits, braking oil pressure generated by the master cylinder 2' is transmitted to the wheel cylinder 7' to urge and move the pistons 8' and 9' in a direction to move the pistons apart, and working oil within each of the oil chambers A' and A" is discharged into the oil passage 32' and the valve 33'. On the other hand, when the braking force is excessive, the pressure oil having passed through the pressure accumulator 29' flows into the oil chambers A' and A" through the valve 30' and the oil passage 39 to urge the pistons 8' and 9' from the back pressure side and oppose the force of the pressure oil fed from the master cylinder 2'. At this time, if the control hydraulic circuit 26', sensor 35' or computer 34' fails to disable the changeover of the valves 30' and 33', the pistons 8' and 9' remain pressurized in a direction close to each other and as a result, the brake device 6' fails to function properly. In order to avoid such a dangerous state, there is provided an oil passage 36', which extends to a safety valve 37' in communication with the oil tank T' through the oil passage 38', branched from the oil passage 39.

The safety valve 37' has a construction indentical to that of the safety valve 37 shown in FIG. 1. Hereafter, therefore, a description will be given of the safety valve 37.

Figure 3:
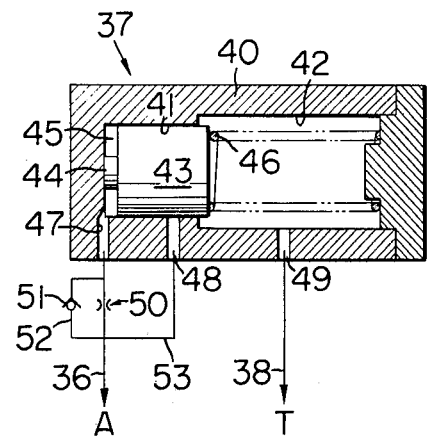
FIG. 3 is a longitudinal sectional view of one embodiment of a safety valve in the anti-skid braking system of the present invention.

In FIG. 3, a casing 40 of the safety valve 37 is internally formed with a cylindrical portion 41 and an escape portion 42 having an inside diameter greater than the inside diameter of the cylindrical portion 41. The cylindrical portion 41 slidably receives therein a piston 43, which is biased by a bias spring 46 towards the left end wall of the cylindrical portion 41 and the piston 43 has a projection 44 so as to form an oil chamber 45 between the piston 43 and the left end wall of the cylindrical portion 41.

The casing 40 has an opening 47 in constant communication with the oil chamber 45, an opening 48 in communication with a portion adjacent the escape portion 42 within the cylindrical portion 41, and an opening 49 in communication with the interior of the escape portion 42. The opening 47 is in communication with the oil chamber A of FIG. 1 through an oil passage 36 having an orifice 50 therein and a by-pass passage 52 with a check valve 51. The opening 48 is in communication with the oil passage 36 at a location between the orifice 50 and the oil chamber A through an oil passage 53, and the opening 49 in communication with the oil tank T of FIG. 1 through an oil passage 38.

When the control hydraulic circuit 26 is actuated due to excessive braking force so that pressure oil flows into the oil chamber A, pressure oil simultaneously flows also into the oil chamber 45 through the orifice 50. At this time, the piston 43 is urged by pressure oil within the oil chamber 45 towards the escape portion 42 against the biasing force of the bias spring 46. However, since the pressure oil flowing into the oil chamber 45 flows thereinto through the orifice 50, the flow-in speed thereof is considerably throttled as compared to the flow-in speed of the pressure oil flowing into the oil chamber A, and hence, the piston 23 in the braking oil pressure control device 4 moves rapidly while the piston 43 moves at a relatively slow speed. During this period, working oil within the escape portion 42 is discharged into the oil tank T through the opening 49 and the oil passage 38. Thus, the control hydraulic circuit 26 is returned to its normal condition to halt the supply of pressure oil into the oil chamber A and the oil chamber A is brought into communication with the oil tank T, while at the same time, supply of pressure oil into the oil chamber 45 is also halted and as a result, the piston 43 is biased by the spring 46 to move towards the left end wall of the cylindrical portion 41. During this time, working oil within the oil chamber 45 is discharged into the oil passage 36 through the opening 47, the oil passage 52, and the check valve 51, and oil is also discharged into the oil passage 36 through the orifice 50 and then into the oil tank T through the oil passage 32 and the valve 33. Thereafter, the piston 43 is repetitiously reciprocated on the basis of the actuation of the control hydraulic circuit 26 as long as the braking force is excessive.

If the control hydraulic circuit 26 fails while supplying pressure oil to the oil chamber A, the piston 43 undergoes movement beyond the amount of movement in a normal operating condition so that the oil chamber 45 comes into communication with the opening 48. At this time, a great quantity of pressure oil within the oil passage 36 flows into the oil chamber 45 through the opening 48 so that the piston 43 is immediately urged into the escape portion 42. As a result, the oil chamber 45 comes into communication with the escape portion 42, and pressure oil within the oil chamber A is discharged into the oil tank T through the oil passage 36, the oil chamber 45, the escape portion 42 and the oil passage 38. Thus, the safety valve 37 can compensate for failure of the control hydraulic circuit 26 to achieve the safety function for the brake device 6.

When the safety valve 37 shown in FIG. 3 is adapted to the position of the safety valve 37' in FIG. 2, the oil passage 36 is placed in communication with the oil passage 39' of FIG. 2, and the oil passage 38 of FIG. 3 is placed in communication with the oil tank T' in FIG. 2. Thus, the oil chamber 45 is placed in communication with the oil chamber A' and oil chamber A" through the orifice 50 and the check valve 51, and the piston 43 is operated under the influence of oil pressure within the oil chamber A' and oil chamber A". At this time, the manner of operation of the piston 43 corresponds to the manner of operation when operated under the influence of oil pressure within the oil chamber 4 in FIG. 1. That is, in the case when the control hydraulic circuit 26' fails while pressure oil is supplied into the oil chamber A' and the oil chamber A", the piston 43 is urged into the escape portion 42 after a lapse of a given period of time, as a consequence of which the oil chamber A' and the oil chamber A" are placed into communication with the oil tank T' through the oil passage 39, the oil passage 36, the oil chamber 45, the escape portion 42 and the oil passage 38. Thus, the safety valve 37 can compensate for failure of the control hydraulic circuit 26' to achieve the safety function for the brake device 6'.

Figure 4:
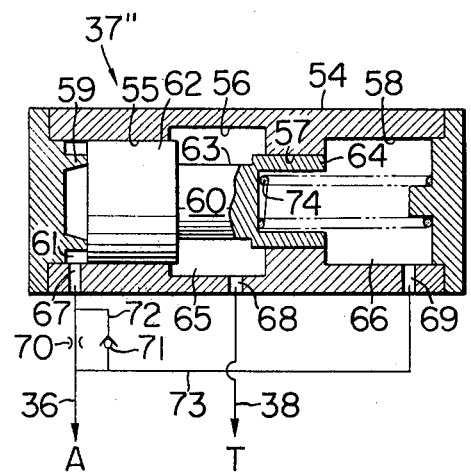
FIG. 4 is a longitudinal sectional view of a modified safety valve in the anti-skid braking system of the present invention.
Figure 5:
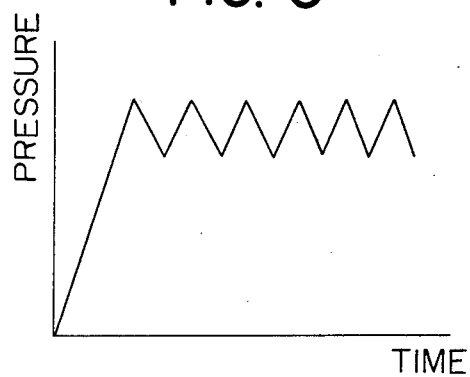
FIG. 5 is a curve showing the fluctuation of control oil pressure of the anti-skid braking system for a vehicle when the latter travels on a slippery running surface.

In the case when vehicles run on a very slippery surface such as an icy road, oil pressure within the oil chamber A of FIG. 1 or the oil chambers A' and A" of FIG. 2 sometimes fluctuates at a high level, as shown by the curve in FIG. 5. For this reason, if the safety valve 37 as in FIG. 3 is used, oil pressure within the oil chamber 45 fluctuates at a high level, as a consequence of which there is the dangerous possibility that the piston 43 is pushed into the escape portion 42 despite the fact that the anti-skid braking system, particularly the control hydraulic circuit 26, 26' operates normally. In order to avoid such a dangerous state FIG. 4 shows a safety valve 37" which represents an improvement of the safety valve 37 shown in FIG. 3.

In the safety valve 37" in FIG. 4, a casing 54 of the safety valve 37" is internally formed with an approximately cylindrical portion 55 whose diameter gradually increases in the axial direction, a large-diameter escape portion 56, a small-diameter cylindrical portion 57 and a small diameter escape portion 58. An annular projection 59 is formed on the inner surface of the left end wall of the large-diameter cylindrical portion 55. A spool 60 housed in the casing 54 has a large-diameter portion 62 in axially sliding contact with the inner peripherical surface of the large-diameter portion 55, a small-diameter portion 64 in axially sliding contact with the inner peripheral surface of the small-diameter portion 57, and a constricted portion 63 connecting the large-diameter portion 62 with the small-diameter portion 64, the spool 60 being normally biased by a bias spring 74 within the small-diameter escape portion 58 towards the projection 59.

An opening 67, which communicates with an oil chamber 61 between the left end wall of the large-diameter portion 55 and the large-diameter portion 62 of the spool 60, is placed into communication with the oil chamber A through an oil passage 36 having an orifice 70 therein and a by-pass passage with a check valve 71. An opening 69 in communication with an oil chamber 66 within the small-diameter portion 58 is in communication with the oil passage 36 at a location between the orifice 70 and the oil chamber A through the oil passage 73. Furthermore, an opening 68, which communicates with an oil chamber 65 between the large-diameter portion 56 and the constricted portion 63 is placed into communication with the oil tank T through the oil passage 38.

When the control hydraulic circuit 26 is actuated due to excessive braking force so that pressure oil flows into the oil chamber A, pressure oil simultaneously flows into the oil chamber 61 through the orifice 70 and also into the oil chamber 66 through the oil passage 73. At this time, suitable selection of the pressure receiving areas of the large-diameter portion 62 and small-diameter portion 64 and the biasing force of the bias spring 74 causes the spool 60 to be moved to the right. However, since pressure oil flowing into the oil chamber 61 flows thereinto through the orifice 70, the flow-in speed thereof is considerably slower as compared to the flow-in speed of pressure oil into the oil chamber A, and hence, the piston 23 in the braking oil pressure control device 4 moves rapidly while the spool 60 moves at a relatively slow speed. During this period, working oil within the oil chamber 65 is discharged into the oil tank T through the opening 68 and the oil passage 38.

When the control hydraulic circuit 26 is returned to its normal state to halt the supply of pressure oil into the oil chamber A and place the oil chamber A into communication with the oil tank T, a supply of pressure oil into the oil chamber 61 is also halted simultaneously therewith so that the spool 60 is moved by the biasing force of the bias spring 74 towards the left. During this time, working oil within the oil chamber 61 partially flows into the oil chamber 66 through the check valve 71, and the remainder is recycled into the oil tank T through the valve 33. Thereafter, the spool 60 is repetitiously reciprocated on the basis of the operation of the control hydraulic circuit 26 as long as the braking force is excessive.

Figure 6:
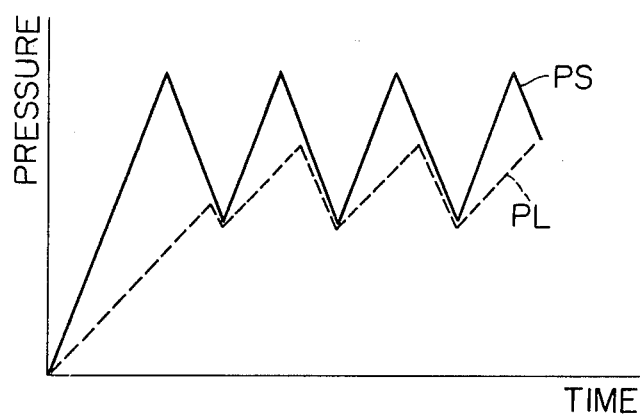
FIG. 6 is a curve showing the fluctuation of oil pressure within an oil chamber of the safety valve shown in FIG. 4.

In the control valve 37" shown in FIG. 4, the oil pressure within the oil chamber 66 is always equal to the oil pressure within the oil chamber A, a fluctuation of oil pressure when the anti-skid braking apparatus is actuated is shown by the solid line (PS) in FIG. 6. On the other hand, since pressure oil flows into the oil chamber 61 through the orifice 70, there is a time lag in the increase in oil pressure within the oil chamber 61 relative to the increase in oil pressure within the oil chamber 66. However, working oil discharged from the oil chamber 61 is also discharged through the check valve 71 in addition to the orifice 70 so that the lowering of the oil pressure within the oil chamber 61 is effected simultaneously with the lowering of the oil pressure within the oil chamber 66. Thus, fluctuation of oil pressure within the oil chamber 61 when the anti-skid braking apparatus is actuated is shown by the dotted line (PL) in FIG. 6.

Figure 7:
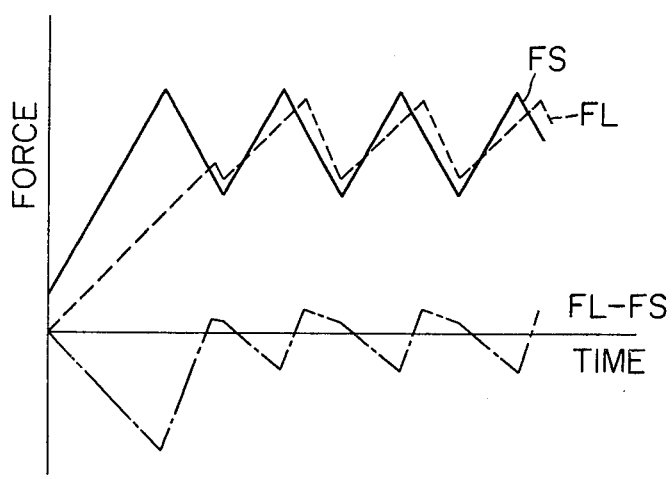
FIG. 7 is a curve showing the fluctuation of a biasing force acting on a piston in the safety valve shown in FIG. 4.

Although the pressure receiving area of the large-diameter portion 62 is larger than that of the small-diameter protion 64, the biasing force of the bias spring 74 acts on the pressure receiving surface of the small-diameter portion 64. Hence, in FIG. 7, the biasing force acting on the pressure receiving surface of the large-diameter portion 62 is shown by the dotted line (FL) whereas the biasing force acting on the pressure receiving surface of the small-diameter portion 64 is shown by the solid line (FS). Thus, the force by which the spool 60 is moved towards the right may be depicted as shown by the broken line (FL-FS) in FIG. 7 by suitably selecting the pressure receiving areas of the large-diameter portion 62 and the small-diameter portion 64 and the magnitude of the biasing force of the bias spring 74. As long as the spool 60 axially slidably moves while receiving the action of the force as shown by the broken line (FL-FS) in FIG. 7, the oil chamber 61 never comes into communication with the oil chamber 65.

The safety valve 37" shown in FIG. 4 is characterized in that an oil pressure equivalent to the oil pressure within the oil chamber A always acts on the pressure receiving surface of the small-diameter portion 64 of the spool 60 whereby even if the oil pressure within the oil chamber A fluctuates at a high level, the oil chamber A never erroneously comes into communication with the oil tank T resulting from communication between the oil chamber 61 and the oil chamber 65 as long as the anti-skid braking apparatus operates normally.

However, if the control hydraulic circuit 26 fails while supplying pressure oil of substantially high pressure into the oil chamber A, the oil pressure within the oil chamber 61 ultimately becomes equal to the oil pressure within the oil chamber 66, and hence, the spool 60 keeps moving to the right and after a given period of time, the large-diameter portion 62 is pushed into the large-diameter portion 56 and at the same time, the small-diameter portion 64 is pushed into the small-diameter escape portion 58. As a result, the oil chamber 61 comes into communication with the oil chamber 65 and the oil chamber 66 also comes into communication with the oil chamber 65. Pressure oil within the oil chamber A passes through the oil passage 36, the oil chamber 61, the oil chamber 65 and the oil passage 38, passes through the oil passage 73, the oil chamber 66, the oil chamber 65 and the oil passage 38 and is discharged into the oil tank T. Thus, the safety valve 37" can compensate for failure of the control hydraulic circuit 26 to achieve the safety function for the brake device 6.

When the safety valve 37" shown in FIG. 4 is adapted to the position of the safety valve 37' in FIG. 2, the oil passage 36 in FIG. 4 is placed into communication with the oil passage 36' of FIG. 2, and the oil passage 38 of FIG. 4 is placed into communication with the oil passage 38' in FIG. 2. Thus, the spool 60 is operated under the influence of oil pressure within the oil chamber A' and oil chamber A".

If the control hydraulic circuit 26' fails while supplying pressure oil of substantially high pressure into the oil chamber A' and the oil chamber A", the oil pressure within the oil chamber 61 ultimately becomes equal to the oil pressure within the oil chamber 66, and hence, after a given period of time, the large-diameter portion 62 is pushed into the large-diameter escape portion 56 and the small-diameter portion 64 is pushed into the small-diameter escape portion 58. Then, the oil chamber A' and the oil chamber A" are placed into communication with the oil tank T' through the oil passage 39', 36', the safety valve 37" and the oil passage 38'. Thus, the safety valve 37" can compensate for failure of the control hydraulic circuit 26' to achieve the safety function for the brake device 6'.

In accordance with the embodiment in FIG. 4, the safety valve is comprised solely of the first oil chamber, the second oil chamber and the third oil chamber, and the spool actuated by oil pressure within the first and second oil chambers and the biasing force of the bias spring, and therefore, the safety valve is simple in construction and may be positively actuated by oil pressure.

In addition, the construction is such that oil pressure equivalent to the oil pressure acting on the side of a pressure receiving surface of relatively large area may act on the side of a pressure receiving surface of relatively small area of the spool in the safety valve in cooperation with the biasing force of the bias spring, and therefore, even if the output oil pressure in the control hydraulic circuit fluctuates at a high level, there is no possible danger that the output oil pressure in the control hydraulic circuit is erroneously released outside the control system, as long as the anti-skid braking system operates properly.

Figure 8:
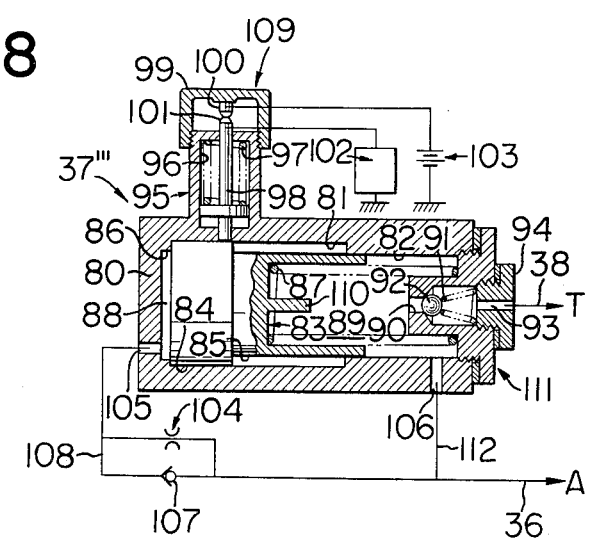
FIG. 8 is a longitudinal sectional view showing yet another embodiment of a safety valve used in the anti-skid braking system of the present invention.

FIG. 8 illustrates a further modified embodiment of the safety valve. A casing 80 of a safety valve 37'" is internally formed with a large-diameter cylindrical portion 81 and a small-diameter cylindrical portion 82. A spool 83 having a large-diameter portion 84 axially slidably movable within the large-diameter portion 81 and a small-diameter portion 85 axially slidably movable within the small-diameter cylinder portion 82 is biased by a bias spring 87 within an oil chamber 89 formed by the small-diameter cylinder portion 82 and is normally placed in abutment with a shoulder portion 86 formed on the left end wall of the large-diameter portion 81 to form an oil chamber 88 between the spool and the left end wall of the cylindrical portion 81.

At the right end wall portion of the small-diameter cylindrical portion 82 there is formed a check valve 111 having a valve hole 90 and a valve ball 92 by which the valve hole 90 is normally closed by the valve ball 92 biased by a bias spring 91 interposed between the hole and a cover member 94. An opening 105 in communication with the oil chamber 88 is in communication with the oil chamber A in FIG. 1 through the oil passage 36 having an orifice 104 therein and a bypass passage having a check valve 107. An opening 106 in communication with the oil chamber 89 is in communication with the oil passage 36 at a location between the orifice 104 and the oil chamber A through an oil passage 112. Furthermore, an opening in communication with the oil chamber 89 through the check valve 111 is in communication with the oil tank T in FIG. 1 through the oil passage 38.

A return-control means 95 for controlling movement of the spool 83 is disposed externally of the large-diameter cylindrical portion 81, and a switch box 99 for a switch 109 is disposed outwardly of the return-control means 95. The return control means 95 comprises a slidably moving rod 98 received in a spring 97 for urging the rod 98 toward the upper end of the large-cylindrical portion 81. The rod 98 has an inner end portion which extends through the large-diameter cylindrical portion 81 and is normally placed in abutment with the outer peripheral surface of the large-diameter portion 84 of the spool 83, and an outer end portion which extends into the switch box 99. The upper end of switch box 99 is provided with a contact 101 connected to an electrical device 102 such as a computer which actuates change-over valves 30 and 33. A contact 100, which is connected to a power source 103, is disposed opposite the contact 101 on the upper inner surface of the switch box 99. These contacts 100 and 101 normally are placed in contact with each other.

A projection 110 extends axially from the right end of the small-diameter portion 85 of the spool 83 so that when the spool 83 is biased and is moved more than a given distance in the oil chamber 89 against the biasing force of the bias spring 87, the projection 110 extends through the valve hole 90 to cause the valve ball 92 to be biased and moved against the biasing force of the bias spring 91 to open the check valve 111. Simultaneously therewith, the large-diameter portion 84 passes beyond the end of the rod 98 so that the rod 98 is biased and moved by the bias spring 97 into the oil chamber 88, as a consequence of which the electrical device 102 is disconnected from the power source 103.

When the control hydraulic circuit 26 is actuated due to excessive braking force so that pressure oil flows into the oil chamber A, the pressure oil simultaneously flows also into the oil chamber 88 through the orifice 104 and also into the oil chamber 89 through the oil passage 112. In this case, the biasing force of the bias spring 91 is adjusted to the extent that the check valve 111 will not allow pressure oil to be passed only by the pressure of the oil within the oil chamber 89. The spool 83 is moved towards right in the oil chamber 89 by suitably selecting the pressure receiving areas of the large-diameter portion 84 and the small-diameter portion 85 and the biasing force of the bias spring 87. However, since pressure oil flowing into the oil chamber 88 flows thereinto through the orifice 104, the flow-in speed thereof is considerably slower as compared to the flow-in speed of the pressure oil flowing into the oil chamber A, and hence, the piston 23 in the braking oil pressure control device 4 moves rapidly whereas the spool 83 moves at a relatively slow speed. During this time, the pressure oil within the oil chamber 89 is transferred into the oil chamber 88 through the oil passages 112 and 36.

When the control hydraulic circuit 26 is returned to its normal state to halt the supply of pressure oil into the oil chamber A, the oil chamber A comes into communication with the oil tank T and at the same time, the supply of pressure oil into the oil chamber 88 is also halted and the spool 83 is moved by the biasing force of the bias spring 87 towards the left into oil chamber 88. During this time, working oil within the oil chamber 88 partially flows into the oil chamber 89 through the check valve 107 and the oil passage 36 whereas the remainder is recycled into the oil tank T through the valve 33. Thereafter, the spool 83 is repetitiously reciprocated on the basis of the actuation of the control hydraulic circuit 26 as long as the braking force is excessive.

If the control hydraulic circuit 26 fails while supplying pressure oil of substantial pressure into the oil chamber A, the oil pressure within the oil chamber 88 becomes equal to the oil pressure within the oil chamber 89, and hence, the spool 83 keeps moving beyond the amount of movement in the normal operating state. Thus, the projection 110 biases the valve ball 92 to open the check valve 111, and the slidably moving rod 92 extends from the large-diameter cylindrical portion 81 into the oil chamber 88 to effect the return of the spool 83 towards the oil chamber 88. As a consequence, the pressure oil within the oil chamber A is discharged into the oil tank T through the oil passage 36, the oil passage 112, the oil chamber 89, the check valve 111, and the oil passage 38, and the electrical device 102 is disconnected from the power source 103. Thus, the safety valve 37 can compensate for failure of the control hydraulic circuit 26 to achieve the safety function for the brake device 6.

When the safety valve 37''' shown in FIG. 8 is adapted to the position of the safety valve 37' shown in FIG. 2, the oil passage 36 in FIG. 8 is placed into communication with the oil passage 36' in FIG. 2 and the oil passage 38 in FIG. 8 is placed into communication with the oil passage 38' in FIG. 2. Accordingly, the spool 83 operates in response to the oil pressure within the oil chamber A' and oil chamber A''.

If the control hydraulic circuit 26' fails while supplying pressure oil of substantial pressure into the oil chamber A' and oil chamber A'', the projection 110 biases the valve ball 92 to open the check valve 111 and the slidably moving rod 98 extends into the oil chamber 88 so that the electrical device 102 is disconnected from the power source 103. Thus, the oil chamber A' and oil chamber A'' are placed into communication with the oil tank T' through the oil passage 36', the oil passage 112, the oil chamber 89, the check valve 111, and the oil passage 38'. Thus, the safety valve 37'''' can compensate for failure of the control hydraulic circuit 26' to achieve the safety function for the brake device 6'.

In accordance with the embodiment shown in FIG. 8, the check valve of the safety valve can release output oil pressure in the control hydraulic circuit outside the control system in response to the movement of the spool when the output oil pressure in the control hydraulic circuit is supplied for more than a predetermined period of time, and therefore, the safety valve may achieve its function in a safe and positive manner with a simple construction thereof.

Furthermore, there is provided the return-control device, which serves to control the return of the spool towards the first oil chamber when the spool moves more than a predetermined amount toward the second oil chamber, and therefore, the safety valve may safely keep its safety function.

In accordance with the present invention, as described above, the safety valve, which can release the control oil pressure outside the control system when the control oil pressure in the control hydraulic circuit is supplied for more than a predetermined period of time, is connected to an oil pressure output section in the control hydraulic circuit, and accordingly, the present invention provides an anti-skid braking system for a vehicle comprising a safety means which can positively perform its safety function to ensure proper braking action of the brake device even if failure occurs in any element in the anti-skid system.

What is claimed is:

1. An anti-skid braking system for a vehicle comprising: brake means actuated by braking oil pressure generated in accordance with a braking input; a control hydraulic circuit means for hydraulically controlling actuation of said brake means to reduce the braking action of said brake means when an excessive braking force is applied by said brake means; said control hydraulic circuit means including a hydraulic output section; safety valve means connected to said output section for releasing control oil pressure in said control hydraulic circuit means when the control oil pressure of said control hydraulic circuit means is supplied for a period exceeding a predetermined time; said safety valve means comprises a spool having a pressure receiving surface of relatively large area at one end thereof and a pressure receiving surface of relatively small area at the other end thereof; a first oil chamber for being pressurized by the oil pressure of the pressure oil in said control hydraulic circuit means to act on said pressure receiving surface of relatively large area thereby urging said spool in one direction of travel; an orifice controlling admission of pressure oil to said first oil chamber; a second oil chamber for being pressurized by the oil pressure of the output pressure oil in said control hydraulic circuit means to directly act on said pressure receiving surface of relatively small area thereby urging said spool in the opposite direction of travel; biasing means urging said spool to travel in said opposite direction of travel; and a third oil chamber for discharging output pressure oil in said control hydraulic circuit means externally thereof upon movement of said spool towards said second oil chamber when the output pressure oil in said control hydraulic circuit means is supplied for a period greater than said determined time.

2. An anti-skid braking system for a vehicle comprising: brake means actuated by braking oil pressure generated in accordance with a braking input; a control hydraulic circuit means for hydraulically controlling actuation of said brake means to reduce the braking action of said brake means when an excessive braking force is applied by said brake means; said control hydraulic circuit means including a hydraulic output section; safety valve means connected to said output section for releasing control oil pressure in said control hydraulic circuit means when the control oil pressure of said control hydraulic circuit means is supplied for a period exceeding a predetermined time; said safety valve means comprises, a spool having a length of travel determined according to the duration of output oil pressure applied to said safety valve means; and check valve means responsive to the travel of said spool for releasing the pressure of the output oil in said control hydraulic circuit means when the output oil pressure in said control hydraulic circuit is applied for a period exceeding said predetermined time.

3. An anti-skid braking system for a vehicle comprising: brake means actuated by braking oil pressure generated in accordance with a braking input; a control hydraulic circuit means for hydraulically controlling actuation of said brake means to reduce the braking action of said brake means when an excessive braking force is applied by said brake means; said control hydraulic circuit means including a hydraulic output section; safety valve means connected to said output section for releasing control oil pressure in said control hydraulic circuit means when the control oil pressure of said control hydraulic circuit means is supplied for a period exceeding a predetermined time; said safety valve means comprises, a spool having a pressure receiving surface of relatively large area at one end thereof and a pressure receiving surface of relatively small area at the other end thereof; a first oil chamber for being pressurized by oil pressure of the pressure oil in said control hydraulic circuit means to act on said pressure receiving surface of relatively large area thereby urging said spool in one direction of travel; an orifice controlling admission of pressure oil to said first oil chamber; a second oil chamber for being pressurized by the oil pressure of the output pressure oil in said control hydraulic circuit means to directly act on said pressure receiving surface of relatively small area thereby urging said spool in the opposite direction; biasing means urging said spool to travel in said opposite direction; a check valve means operative in response to movement of said spool to release the output oil pressure in said control hydraulic circuit means when said spool has been moved more than given distance towards said second oil chamber under the action of the output pressure oil in said control hydraulic circuit means for a period exceeding said predetermined time; and return-control means defined by a slidably moving rod co-acting with spring means, for urging said rod toward a portion of a cylindrical casing positioning said spool for controlling the return of said spool towards said first oil chamber when said check valve means is opened.

* * * * *